(12) United States Patent
Jackson et al.

(10) Patent No.: US 11,613,964 B2
(45) Date of Patent: Mar. 28, 2023

(54) THROUGH TUBING INSERT SAFETY VALVE FOR FLUID INJECTION

(71) Applicants: Todd Christophe Jackson, Houston, TX (US); Christopher William Hales, Peterhead (GB)

(72) Inventors: Todd Christophe Jackson, Houston, TX (US); Christopher William Hales, Peterhead (GB)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 267 days.

(21) Appl. No.: 16/917,996

(22) Filed: Jul. 1, 2020

(65) Prior Publication Data

US 2022/0003075 A1    Jan. 6, 2022

(51) Int. Cl.
*E21B 34/10* (2006.01)
*F16K 31/122* (2006.01)

(52) U.S. Cl.
CPC .......... *E21B 34/10* (2013.01); *F16K 31/1226* (2013.01)

(58) Field of Classification Search
CPC .................................................. F16K 31/1226
See application file for complete search history.

(56) References Cited

U.S. PATENT DOCUMENTS

| 4,042,033 | A | 8/1977 | Holland et al. |
| 6,148,920 | A | 11/2000 | Mccalvin |
| 2002/0066574 | A1* | 6/2002 | Leismer ................ E21B 34/066 166/386 |
| 2005/0098210 | A1 | 5/2005 | Strattan et al. |
| 2008/0271893 | A1 | 11/2008 | Hill et al. |
| 2010/0025045 | A1* | 2/2010 | Lake ..................... E21B 34/066 166/373 |

* cited by examiner

*Primary Examiner* — Dany E Akakpo
(74) *Attorney, Agent, or Firm* — Cantor Colburn LLP (57) ABSTRACT

An insert safety valve includes a valve body having a valve member, and a control fluid conduit fluidically connected to the valve body. The insert safety valve being responsive to a control fluid at a first pressure to shift the valve member and open the valve body to a fluid flow and at a second pressure to add the control fluid to the fluid flow.

20 Claims, 9 Drawing Sheets

THROUGH TUBING INSERT SAFETY VALVE FOR FLUID INJECTION

BACKGROUND

In the resource recovery industry, valves are used to control fluid flow into and out from a wellbore. One type of valve, subsurface safety valve (SSSV), is provided in a wellbore to prevent an uncontrolled release of wellbore fluids. For example, the wellbore may be provided with tubing run SSSV (TRSSSV) that includes a fail-safe flapper mechanism which is held open to allow flow. When accessing a wellbore with a conduit, the flapper is held open. For the flapper to close, the conduit must be withdrawn.

In some cases, an insert safety valve may be carried by the conduit. The insert safety valve is mounted within the held open TRSSSV or a dedicated nipple profile and may be closed so as to prevent uncontrolled release of wellbore fluids. The insert safety valve is controlled by hydraulic pressure. That is a fluid is delivered to the insert safety valve at a selected pressure to open a flow path. The fluid acts on an actuator that opens the valve. Often it is desirable to inject fluids, such as chemicals downhole of the insert safety valve.

Currently, providing fluid injection capabilities requires running additional conduits into the wellbore during well construction. Running additional conduits into the wellbore after initial well construction is costly, reduces a volume of the wellbore that could otherwise be used for production, and can prevent operation of the TRSSSV flapper. Accordingly, the industry would be open to new systems for injecting fluid below an insert safety valve.

SUMMARY

Disclosed is an insert safety valve including a valve body having a valve member, and a control fluid conduit fluidically connected to the valve body. The insert safety valve being responsive to a control fluid at a first pressure to shift the valve member and open the valve body to a fluid flow and at a second pressure to add the control fluid to the fluid flow.

Also disclose is a resource exploration and recovery system including a surface system and a subterranean system fluidically connected to the surface system through a tubular string, and an insert safety valve coupled to the tubular string. The insert safety valve includes a valve body having a valve member, and a control fluid conduit fluidically connected to the valve body. The insert safety valve is responsive to a control fluid at a first pressure to shift the valve member and open the valve body to a fluid flow and at a second pressure to add the control fluid to the fluid flow.

Further disclosed is a method of operating an insert safety valve includes applying a control fluid at a first pressure to an insert safety valve arranged in a tubular, opening a valve member with the control fluid pressure, passing formation fluid from the tubular radially inwardly into the insert safety valve and through a primary fluid outlet, increasing the pressure of the control fluid, and discharging treatment fluid from a treatment fluid outlet of the insert safety valve into the formation fluid.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
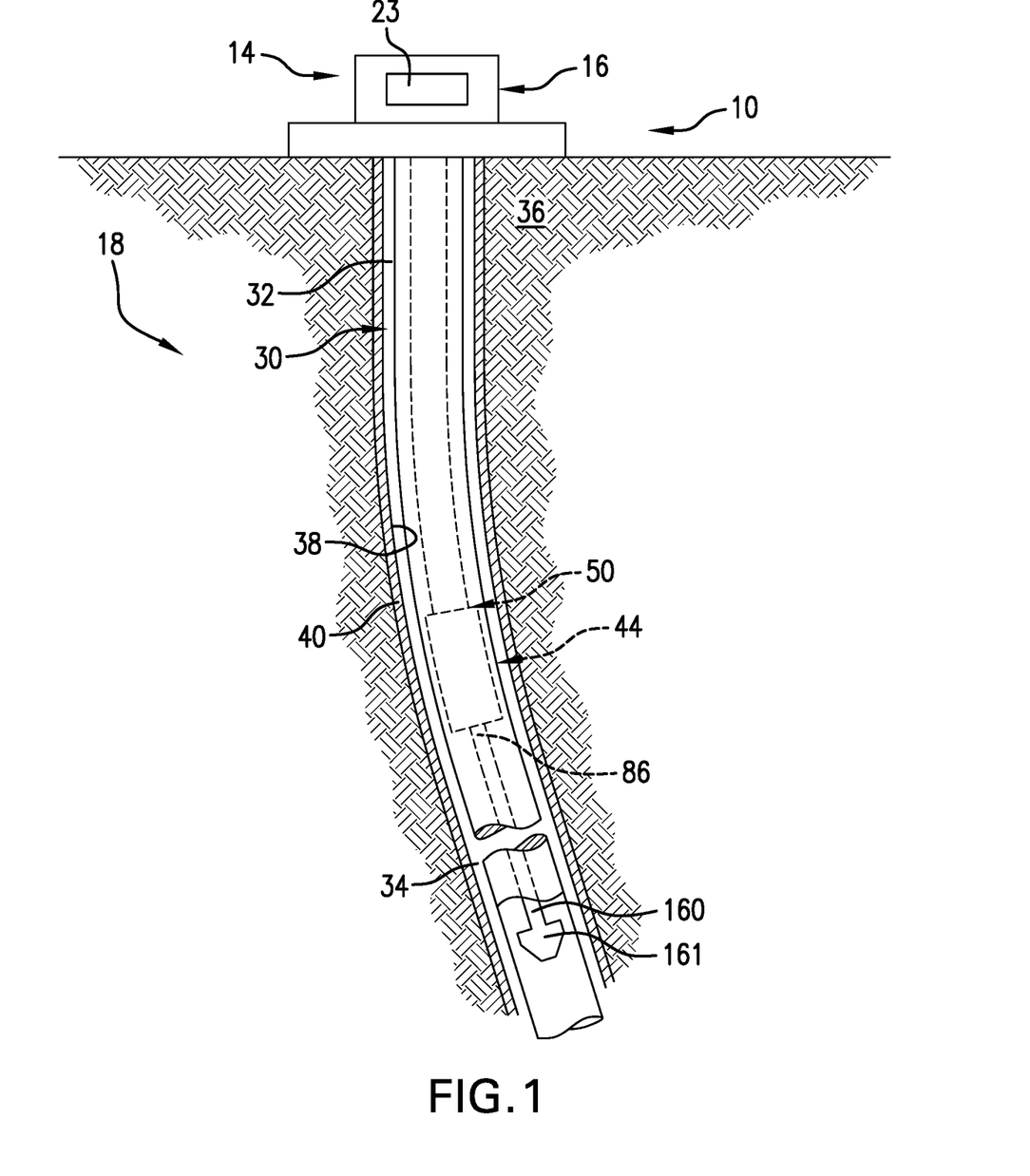
FIG. 1 depicts a resource exploration and recovery system including an insert safety valve having a fluid injection system.

A resource exploration and recovery system, in accordance with an exemplary embodiment, is indicated generally at 10, in FIG. 1. Resource exploration and recovery system 10 should be understood to include well drilling operations, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a subterranean system. First system 14 may include a control system 23 that may provide power to, monitor, communicate with, and/or activate one or more downhole operations as will be discussed herein. Surface system 16 may include additional systems such as pumps, fluid storage systems, cranes and the like (not shown).

Second system 18 may include a tubular string 30, formed from one or more tubular members, such as indicated at 32, which extends into a wellbore 34 formed in a formation 36. Wellbore 34 includes an annular wall 38 which may be defined by a casing tubular 40 or by a surface (not separately labeled) of formation 36. A tubing retrievable safety valve (TRSV) 44 is positioned in tubular string 30. TRSV may include a flapper 46 (FIG. 2) that is selectively closed to prevent uncontrolled release of formation fluids from wellbore 34.

Figure 2:
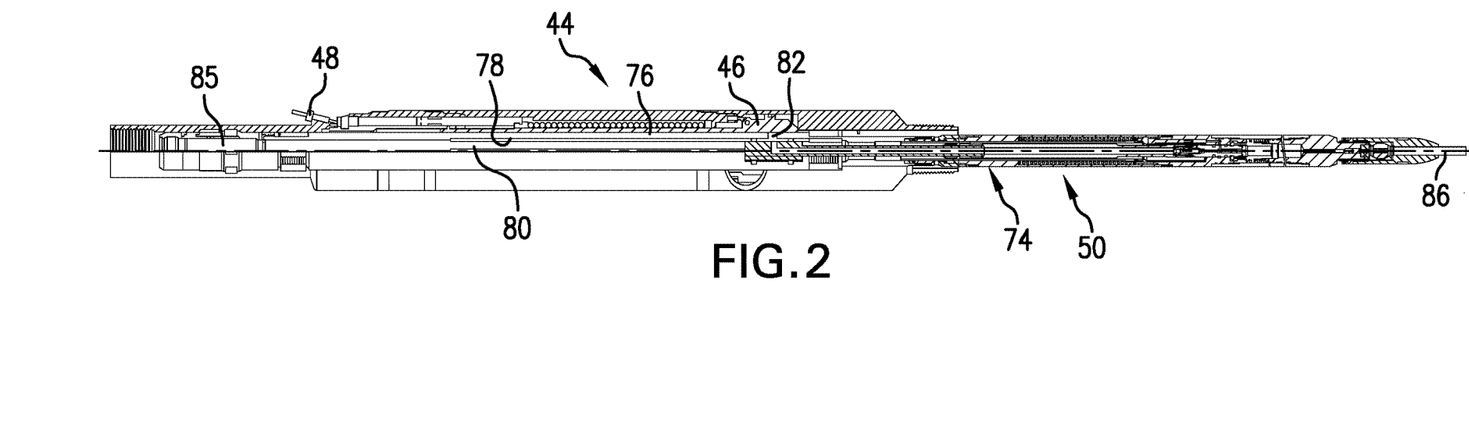
FIG. 2 depicts an insert safety valve arranged in a tubing run safety valve, in accordance with an exemplary aspect.

Referring to FIG. 2, TRSV 44 includes a control fluid conduit 48 that receives hydraulic fluid used to open and maintain flapper 46 open. An insert safety valve 50 extends through TRSV 44. Insert safety valve 50 seals above TRSV and holds flapper 46 open. With this arrangement, insert safety valve 50 provides access to portions of wellbore 34 downhole of TRSV 44 while, at the same time, preventing uncontrolled release of fluid from wellbore 34 into tubular string 30 above TRSV 44. As will be detailed herein, in addition to preventing an uncontrolled release of formation fluids, insert safety valve may also pass a fluid, such as a treatment fluid into tubular string 30 below, or downhole relative to, TRSV 44.

Figure 3A:
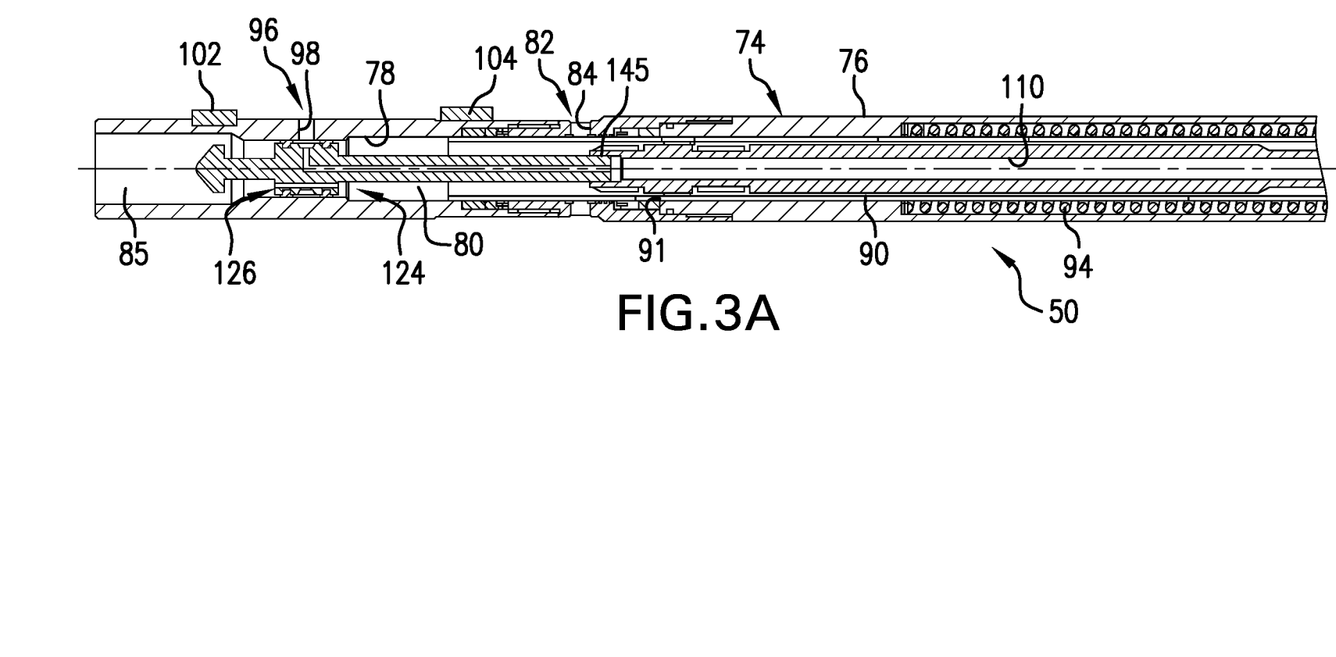
FIG. 3A depicts a cross-section view of a first portion of the insert safety valve of FIG. 2.
Figure 3B:
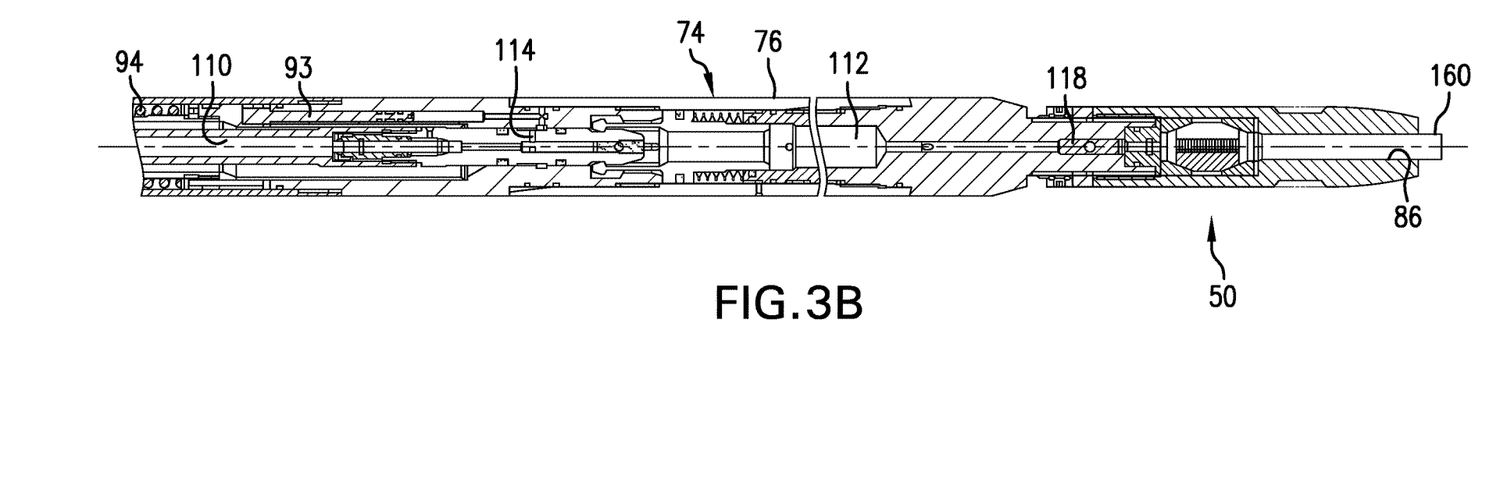
FIG. 3B depicts a cross-sectional view of a second portion of the insert safety valve of FIG. 2, in accordance with an exemplary aspect.

TRSV 44 is shown as a preexisting or installed safety valve with insert safety valve 50 installed within it to replace the function of the TRSV 44 and allow for fluid injection. In accordance with an exemplary embodiment depicted in 3A and 3B and with continued reference to FIG. 2, insert safety valve 50 includes a valve body 74 having an outer surface 76 and an inner surface 78 that defines a flow path 80. One or more openings 82 are formed through outer surface 76 and inner surface 78 fluidically connecting flow path 80 with an exterior flow path outside insert safety valve outer surface 76 and interior surfaces (not separately labeled) of TRSV 44 and tubular string 30. Openings 82 define an inlet 84 from insert safety valve outer surface 76 to inner surface 78 to access flow path 80. A first or primary fluid outlet 85 is axially spaced from inlet 84 in a first direction and a second or treatment fluid outlet 86 is axially spaced from inlet 84 in a second direction. Inlet 84 is fluidically connected to first outlet 85 and is fluidically isolated from treatment fluid outlet 86.

Insert safety valve 50 also includes a valve member 90 having one or more ports 91 that selectively align with openings 82. As will be detailed herein, a piston 93 forces valve member 90 against a spring 94 to open inlet 84. At this point, formation fluids may pass radially inwardly into insert safety valve 50 and flow uphole through flow path 80 and pass from first outlet 85 toward first system 14.

In accordance with an exemplary embodiment, insert safety valve 50 includes a control input 96 in the form of a control opening 98 that extends through outer surface 76 and inner surface 78. Control opening 98 is fluidically exposed to hydraulic or control fluid passing through control fluid conduit 48. A first seal 102 axially spaced from control opening 98 in a first direction is provided on outer surface 76. A second seal 104 is axially spaced from control opening 98 in a second opposing directions.

First and second seals 102 and 104 form an annular volume (not separately labeled) at control opening 98 between outer surface 78 and TRSV 44 for the input of control fluid to a control passage 110 arranged in insert safety valve 50. Control passage 110 includes a first portion 112 that extends centrally along a longitudinal axis of valve body 74 and a second portion 114 that extends radially outwardly from first portion 112 toward piston 93. First portion 112 defines a pressure chamber (not separately labeled). As will be detailed herein, fluid passing through control opening 98 passes into control passage 110 and flows to second portion 114 to shift piston 93, compress spring 94 and aligning opening ports 91 with inlet 84 to allow access to flow path 80.

In an embodiment, insert safety valve 50 includes a check valve 118 fluidically connected to first portion 112 of control passage 110. Check valve 118 is configured to open when exposed to a selected pressure in the pressure chamber defined by first portion 112 of control passage 110. Once opened, fluid, such as treatment fluid may pass from control passage 110 and through second outlet 86 as will be detailed herein. The fluid may take on various forms and states including liquid and gaseous fluids.

Figure 4:
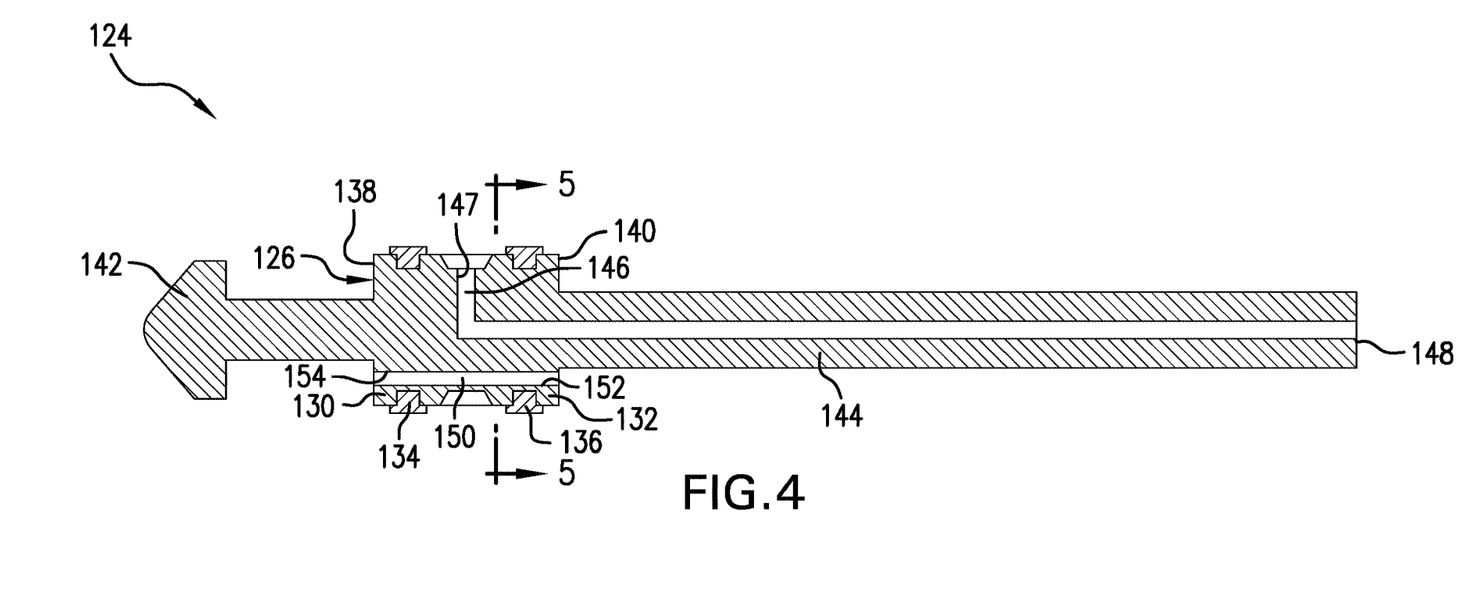
FIG. 4 depicts a cross-sectional view of a seal nut of the insert safety valve of FIG. 2.
Figure 5:
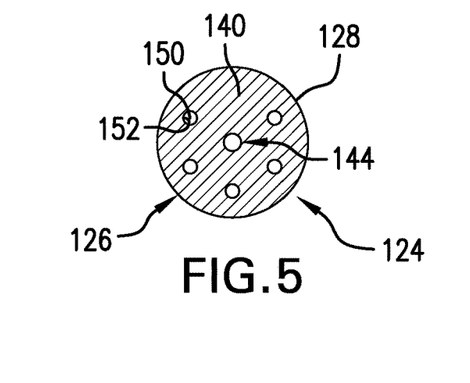
FIG. 5 depicts a cross-sectional view of the seal nut of FIG. 4 taken along the line 5-5.

In accordance with an exemplary aspect, a seal nut 124 provides an interface between control opening 98 and control fluid passage 110. Seal nut 124 is arranged in flow path 80 at control opening 98. As shown in FIGS. 4 and 5, seal nut 124 includes a body 126 having an annular outer surface 128 including a first seal land 130 and a second seal land 132 spaced from first seal land 130 by a recess (not separately labeled). A first seal 134 is arranged in first seal land 130 and a second seal is arranged ion second seal land 132. Seal nut 124 also includes a first axial end 138 and a second, opposing axial end 140. First axial end 138 supports a fishing neck 142 that may be used to withdraw and/or install seal nut 124 into insert safety valve 50. To facilitate repair, cleaning or the like. Second, opposing axial end 140 supports a nipple 144 that extends into a stinger assembly 145 arranged at and axial end (not separately labeled) of control passage 110. In and fluidically connects with control passage 110.

In an embodiment, seal nut 124 includes a first passage 146 having an inlet 147 at annular outer surface 128 and an outlet 148 at nipple 144. A plurality of second passages 150 also extend through seal nut 124. Second passages 150 include an inlet 152 at second axial end 140 and an outlet at first axial end 138.

In operation, after insert safety valve 50 is installed into TRSV 44 fluid is introduced into control fluid conduit 48. The fluid flows into from TRSV 44 into the annular volume and into control opening 98. The fluid passes into first passage 146 and is received in first portion 112 of control passage 110. The fluid acts on check valve 118 and piston 93. The fluid is at a pressure sufficient to move piston 93 but not so high as to open check valve 118. Piston 93 acts on valve member 90 opening ports 91 to formation fluids passing over insert safety valve 50. The formation fluids pass radially inwardly into flow path 80 and travel through first outlet 85 and passages 150 uphole to system 14.

If it is desired to treat the formation fluids, the pressure of the fluid acting on check valve 118 is increased to a predetermined level. Check valve 118 opens allowing the fluid to pass through second outlet 86 in a downhole direction. The fluid may pass along a capillary tube 160 (FIG. 1) that extends from treatment fluid outlet 86 into wellbore 34 and flow radially outwardly though an outlet member 162 into the formation fluids. The fluid may be used to change a viscosity of the formation fluids, increase lift, reduce contaminates or the like. Regardless, the fluid not only maintains valve member 90 in the open position aligned with ports 84 but also passes centrally through insert safety valve 50 into the formation fluids. In this regard, insert safety valve 50 passes fluid flow in two distinct directions. Formation fluids pass into insert safety valve 50 and flow uphole in a first direction and treatment fluids may pass through insert safety valve 50 first as a control fluid and then as a treatment fluid that flows downhole in a second direction.

Figure 6:
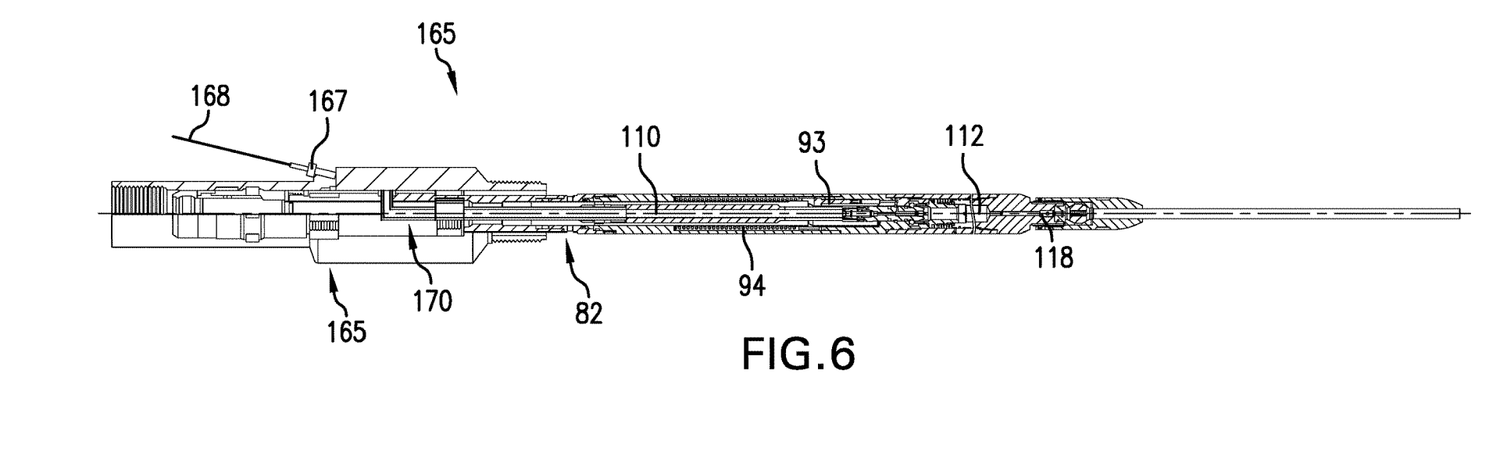
FIG. 6 depicts a nipple in tubing string supporting an insert safety valve arranged in a tubing run safety valve in accordance with another aspect of an exemplary embodiment.
Figure 7A:
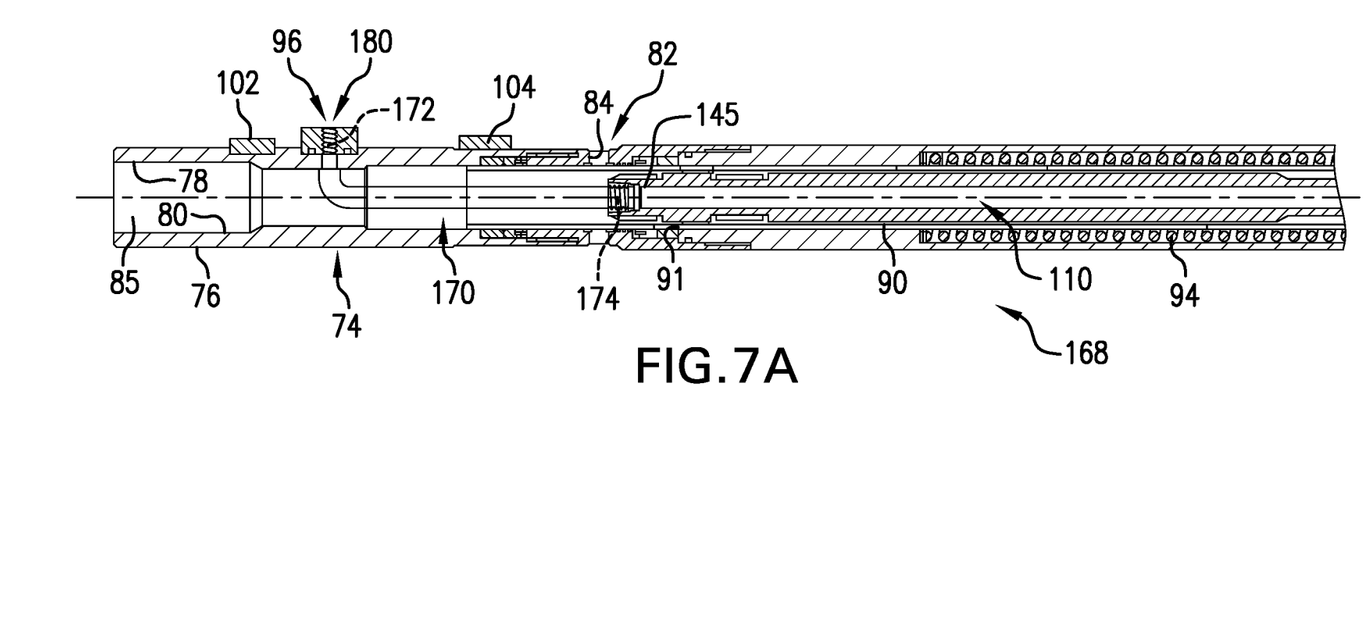
FIG. 7A depicts a cross-section view of a first portion of an insert safety valve in accordance with another exemplary aspect.
Figure 7B:
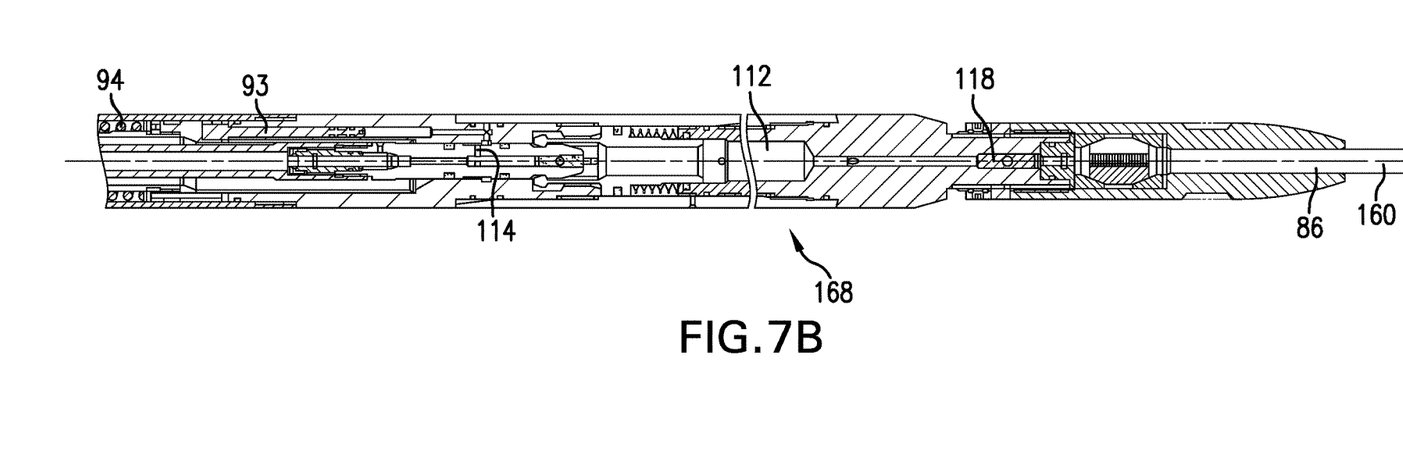
FIG. 7B depicts a cross-sectional view of a second portion of the insert safety valve of FIG. 6A, in accordance with an exemplary aspect.

Reference will now follow to FIGS. 6, 7A and 7B, wherein like reference numbers represent corresponding parts in the respective views, in describing a nipple in tubing string 165 including an insert safety valve 166 that is constructed to not only selectively receive formation fluids but to also allow for fluid treatment. As an example, nipple tubing string 165 may provide for chemical treatment of formation fluids passing into tubular string 30. Insert safety valve 166 includes a dedicated landing nipple 167 supporting a control fluid conduit 168 that is fluidically connected to a bent pipe nipple 170 having a first end 172 that extends though inner surface 78 and outer surface 76 and a second end 174. First end 172 includes a plurality of threads 178 while second end 174 may include a press-fit connection that is secured in stinger assembly 145 of control passage 110. First end 172 is fluidically connected to control fluid conduit 168. insert safety valve 166

Figure 8:
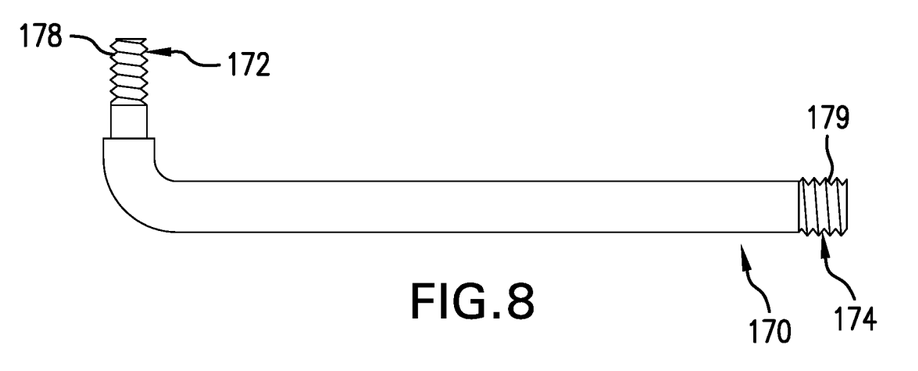
FIG. 8 depicts a bent pipe nipple of the insert safety valve of FIG. 6 in accordance with an exemplary aspect.
Figure 9:
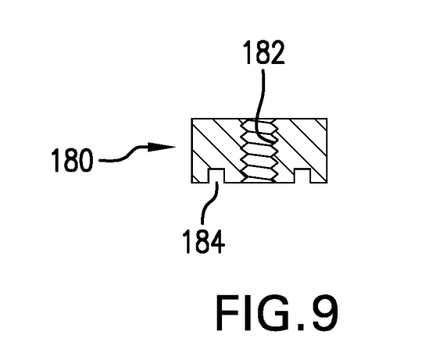
FIG. 9 depicts a cross-sectional view of a face nut of the insert safety valve of FIG. 6 in accordance with an exemplary aspect.

In further accordance with an exemplary embodiment illustrated in FIG. 7, first end 172 of bent pipe nipple 170 is secured to valve body 74 through a face seal nut 180. Face seal nut 180 includes a passageway 182 that is fluidically connected with control passage 110 through bent pipe nipple 170. Passageway 182 is internally threaded so as to engage with plurality of threads 178 on first end 172. While shown as being attached by threads, various attachment mechanisms including press-fit, welding, and the like may be employed. Rereferring to FIG. 8 and with continued reference to FIG. 6A face seal nut 180 includes an annular recess 184 that may receive a seal (not shown).

In operation, control fluid is introduced into control fluid conduit 168 and passes through dedicated landing nipple 167 into and filling the annular space between seals 102 and 104. The control fluid flows from the annular volume, thru passageway 182 and then into first end 172 of bent pipe nipple 170. The control fluid passes into first portion 112 of control passage 110. The fluid acts on check valve 118 passes into second portion 114 to act upon piston 93. The fluid is at a pressure sufficient to move piston 93 but not so high as to open check valve 118. Piston 93 acts on valve member 90 opening ports 91 to formation fluids passing over insert safety valve 50. The formation fluids pass radially inwardly into flow path 80 and travel uphole.

If it is desired to treat the formation fluids, the pressure of the control fluid acting on check valve 118 is increased to a predetermined level. Check valve 118 opens allowing the control fluid to pass through second outlet 86. The fluid may pass along a capillary tube 160 that extends from second outlet 86 into wellbore 34 and flows outwardly through outlet 161 into the formation fluids. The fluid may be used to change a viscosity of the formation fluids, increase lift, reduce contaminates or the like. Regardless, the fluid not only maintains valve member 90 open but also passes centrally through insert safety valve 166 into the formation fluids. In this regard, insert safety valve 166 passes fluid flow in two distinct directions. Formation fluids pass into insert safety valve 166 and flow uphole in a first direction and treatment fluids may pass through insert safety valve 166 first as a control fluid and then as a treatment fluid that flows downhole in a second direction.

Set forth below are some embodiments of the foregoing disclosure:

Embodiment 1. An insert safety valve comprising: a valve body including a valve member; and a control fluid conduit fluidically connected to the valve body, the insert safety valve being responsive to a control fluid at a first pressure to shift the valve member and open the valve body to a fluid flow and at a second pressure to add the control fluid to the fluid flow.

Embodiment 2. The insert safety valve according to any prior embodiment, wherein the valve body includes an outer surface and an inner surface defining a flow path, a primary fluid outlet, and a treatment outlet, the valve body including an opening that extends through the outer surface and inner surface between the first and second outlets, the opening defining an inlet that is fluidically connected to the primary fluid outlet through the flow path, the valve member being selectively shiftable relative to the valve body to selectively uncover the opening allowing the fluid flow to pass into the inlet and flow through the primary fluid outlet.

Embodiment 3. The insert safety valve according to any prior embodiment, wherein the valve body includes a control passage fluidically connected to the control fluid conduit, the control passage including a first portion defining a pressure chamber selectively fluidically connected to the treatment fluid outlet and a second portion operatively connected to the valve.

Embodiment 4. The insert safety valve according to any prior embodiment, further comprising: a check valve fluidically connected to the pressure chamber, the check valve selectively fluidically connecting the pressure chamber and the treatment fluid outlet.

Embodiment 5. The inert safety valve according to any prior embodiment, wherein the check valve opens at the second pressure to pass treatment fluid into the fluid flow downhole of the insert safety valve.

Embodiment 6. The insert safety valve according to any prior embodiment, further comprising: a bent pipe nipple arranged in the flow path and fluidically connecting the control fluid conduit and the control passage.

Embodiment 7. The insert safety valve according to any prior embodiment, further comprising: a face seal nut mechanically connected to a first end of the bent pipe nipple.

Embodiment 8. The insert safety valve according to any prior embodiment, further comprising: a seal nut arranged in the flow path fluidically connecting the control opening with the control passage.

Embodiment 9. The insert safety valve according to any prior embodiment, wherein the seal nut includes a first seal land supporting a first seal engaging the inner surface axially spaced from the control opening in a first direction and a second seal land including a second seal engaging the inner surface axially spaced from the control opening in a second direction opposite the first direction.

Embodiment 10. The insert safety valve according to any prior embodiment, wherein the seal nut includes a first passage fluidically connected with the control passage and a second passage arranged radially outwardly of the first passage, the second passage fluidically connecting the inlet and the first outlet.

Embodiment 11. The insert safety valve according to any prior embodiment, further comprising: a fishing neck extending axially outwardly of the seal nut.

Embodiment 12. A resource exploration and recovery system comprising: a surface system; a subterranean system fluidically connected to the surface system through a tubular string; and an insert safety valve coupled to the tubular string, the insert safety valve comprising: a valve body including a valve member; and a control fluid conduit fluidically connected to the valve body, the insert safety valve being responsive to a control fluid at a first pressure to shift the valve member and open the valve body to a fluid flow and at a second pressure to add the control fluid to the fluid flow.

Embodiment 13. The resource exploration and recovery system according to any prior embodiment, wherein the valve body includes an outer surface and an inner surface defining a flow path, a primary fluid outlet, and a treatment outlet, the valve body including an opening that extends through the outer surface and inner surface between the first and second outlets, the opening defining an inlet that is fluidically connected to the primary fluid outlet through the flow path, the valve member being selectively shiftable relative to the valve body to selectively uncover the opening allowing the fluid flow to pass into the inlet and flow through the primary fluid outlet.

Embodiment 14. The insert safety valve according to any prior embodiment, wherein the valve body includes a control passage fluidically connected to the control fluid conduit, the control passage including a first portion defining a pressure chamber selectively fluidically connected to the treatment fluid outlet and a second portion operatively connected to the valve.

Embodiment 15. The insert safety valve according to any prior embodiment, further comprising: a check valve fluidically connected to the pressure chamber, the check valve selectively fluidically connecting the pressure chamber and the treatment fluid outlet.

Embodiment 16. The inert safety valve according to any prior embodiment, wherein, the check valve opens at the second pressure to pass treatment fluid into the fluid flow downhole of the insert safety valve.

Embodiment 17. The resource exploration and recovery system according to any prior embodiment, further comprising: a bent pipe nipple arranged in the flow path and fluidically connecting the control fluid conduit and the control passage.

Embodiment 18. The resource exploration and recovery system according to any prior embodiment, further comprising: a seal nut arranged in the flow path fluidically connecting the control opening with the control passage.

Embodiment 19. The resource exploration and recovery system according to any prior embodiment, wherein the seal nut includes a first passage fluidically connected with the control passage and a second passage arranged radially outwardly of the first passage, the second passage fluidically connecting the inlet and the first outlet.

Embodiment 20. A method of operating an insert safety valve comprising: applying a control fluid at a first pressure to an insert safety valve arranged in a tubular; opening a valve member with the control fluid pressure; passing formation fluid from the tubular radially inwardly into the insert safety valve and through a primary fluid outlet; increasing the pressure of the control fluid; and discharging treatment fluid from a treatment fluid outlet of the insert safety valve into the formation fluid.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made, and equivalents may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An insert safety valve comprising:
a valve body including a valve member; and
a control fluid conduit fluidically connected to the valve body, the insert safety valve being responsive to a control fluid at a first pressure to shift the valve member and open the valve body to a fluid flow and at a second pressure that is greater than first pressure to add the control fluid to the fluid flow.

2. The insert safety valve according to claim 1, wherein the valve body includes an outer surface and an inner surface defining a flow path, a primary fluid outlet, and a treatment outlet, the valve body including an opening that extends through the outer surface and inner surface between the primary fluid outlet and the treatment outlet, the opening defining an inlet that is fluidically connected to the primary fluid outlet through the flow path, the valve member being selectively shiftable relative to the valve body to selectively uncover the opening allowing the fluid flow to pass into the inlet and flow through the primary fluid outlet.

3. The insert safety valve according to claim 2, wherein the valve body includes a control passage fluidically connected to the control fluid conduit, the control passage including a first portion defining a pressure chamber selectively fluidically connected to the treatment fluid outlet and a second portion operatively connected to the valve.

4. The insert safety valve according to claim 3, further comprising: a check valve fluidically connected to the pressure chamber, the check valve selectively fluidically connecting the pressure chamber and the treatment outlet.

5. The inert safety valve according to claim 4, wherein the check valve opens at the second pressure to pass treatment fluid into the fluid flow downhole of the insert safety valve.

6. The insert safety valve according to claim 4, further comprising: a bent pipe nipple arranged in the flow path and fluidically connecting the control fluid conduit and the control passage.

7. The insert safety valve according to claim 6, further comprising: a face seal nut mechanically connected to a first end of the bent pipe nipple.

8. The insert safety valve according to claim 4, further comprising: a seal nut arranged in the flow path fluidically connecting the opening with the control passage.

9. The insert safety valve according to claim 8, wherein the seal nut includes a first seal land supporting a first seal engaging the inner surface axially spaced from the opening in a first direction and a second seal land including a second seal engaging the inner surface axially spaced from the opening in a second direction opposite the first direction.

10. The insert safety valve according to claim 8, wherein the seal nut includes a first passage fluidically connected with the control passage and a second passage arranged radially outwardly of the first passage, the second passage fluidically connecting the inlet and the primary fluid outlet.

11. The insert safety valve according to claim 8, further comprising: a fishing neck extending axially outwardly of the seal nut.

12. A resource exploration and recovery system comprising:
   a surface system;
   a subterranean system fluidically connected to the surface system through a tubular string; and
   an insert safety valve coupled to the tubular string, the insert safety valve comprising:
      a valve body including a valve member; and
      a control fluid conduit fluidically connected to the valve body, the insert safety valve being responsive to a control fluid at a first pressure to shift the valve member and open the valve body to a fluid flow and at a second pressure greater than the first pressure to add the control fluid to the fluid flow.

13. The resource exploration and recovery system according to claim 12, wherein the valve body includes an outer surface and an inner surface defining a flow path, a primary fluid outlet, and a treatment outlet, the valve body including an opening that extends through the outer surface and inner surface between the primary fluid outlet and the treatment outlet, the opening defining an inlet that is fluidically connected to the primary fluid outlet through the flow path, the valve member being selectively shiftable relative to the valve body to selectively uncover the opening allowing the fluid flow to pass into the inlet and flow through the primary fluid outlet.

14. The insert safety valve according to claim 13, wherein the valve body includes a control passage fluidically connected to the control fluid conduit, the control passage including a first portion defining a pressure chamber selectively fluidically connected to the treatment fluid outlet and a second portion operatively connected to the valve.

15. The insert safety valve according to claim 14, further comprising: a check valve fluidically connected to the pressure chamber, the check valve selectively fluidically connecting the pressure chamber and the treatment outlet.

16. The inert safety valve according to claim 15, wherein, the check valve opens at the second pressure to pass treatment fluid into the fluid flow downhole of the insert safety valve.

17. The resource exploration and recovery system according to claim 15, further comprising: a bent pipe nipple arranged in the flow path and fluidically connecting the control fluid conduit and the control passage.

18. The resource exploration and recovery system according to claim 15, further comprising: a seal nut arranged in the flow path fluidically connecting the opening with the control passage.

19. The resource exploration and recovery system according to claim 18, wherein the seal nut includes a first passage fluidically connected with the control passage and a second passage arranged radially outwardly of the first passage, the second passage fluidically connecting the inlet and the primary fluid outlet.

20. A method of operating an insert safety valve comprising:
   applying a control fluid at a first pressure to the insert safety valve arranged in a tubular;
   opening a valve member with the control fluid pressure;
   passing formation fluid from the tubular radially inwardly into the insert safety valve and through a primary fluid outlet;
   increasing the first pressure of the control fluid; and
   discharging treatment fluid and the control fluid from a treatment fluid outlet of the insert safety valve into the formation fluid.

* * * * *